US010068211B2

(12) United States Patent
Cole et al.

(10) Patent No.: US 10,068,211 B2
(45) Date of Patent: Sep. 4, 2018

(54) REALLOCATION OF RESOURCES SYSTEM (71) Applicant: BANK OF AMERICA CORPORATION, Charlotte, NC (US)

(72) Inventors: Kevin T. Cole, Charlotte, NC (US); Matthew Hsieh, Charlotte, NC (US); Scott R. Enscoe, Charlotte, NC (US); Caitlin Chrisman Bullock, Durham, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 277 days.

(21) Appl. No.: 14/987,008

(22) Filed: Jan. 4, 2016

(65) Prior Publication Data
US 2017/0193474 A1 Jul. 6, 2017

(51) Int. Cl.
*G06Q 20/40* (2012.01)
*G06Q 20/10* (2012.01)
*G06Q 20/32* (2012.01)
*G06Q 30/06* (2012.01)
*H04L 29/08* (2006.01)
*H04L 29/06* (2006.01)

(52) U.S. Cl.
CPC ....... *G06Q 20/108* (2013.01); *G06Q 20/3221* (2013.01); *G06Q 20/3223* (2013.01); *G06Q 20/3224* (2013.01); *G06Q 20/401* (2013.01); *G06Q 30/0633* (2013.01); *H04L 63/08* (2013.01); *H04L 67/20* (2013.01)

(58) Field of Classification Search
CPC .................................................. G06Q 20/108

USPC .......................................................... 705/42
See application file for complete search history.

(56) References Cited

U.S. PATENT DOCUMENTS

| 5,751,805 | A | 5/1998 | Otsuki et al. |
|---|---|---|---|
| 7,792,748 | B1 | 9/2010 | Ebersole et al. |
| 8,788,388 | B2 | 7/2014 | Chatterji et al. |
| 2002/0152145 | A1 | 10/2002 | Wanta et al. |
| 2003/0120572 | A1* | 6/2003 | Coventry ............... G06Q 40/00 705/35 |
| 2004/0267665 | A1 | 12/2004 | Nam et al. |
| 2005/0150945 | A1 | 7/2005 | Choi |
| 2006/0195816 | A1 | 8/2006 | Grandcolas et al. |
| 2007/0011089 | A1 | 1/2007 | DeSchryver |
| 2007/0244811 | A1 | 10/2007 | Tumminaro |
| 2007/0255620 | A1 | 11/2007 | Tumminaro et al. |
| 2007/0265984 | A1 | 11/2007 | Santhana |
| 2007/0278290 | A1 | 12/2007 | Messerges et al. |

(Continued)

Primary Examiner — Cho Kwong
(74) Attorney, Agent, or Firm — Michael A. Springs; Moore & Van Allen PLLC; Nicholas C. Russell (57) ABSTRACT Embodiments of the invention are directed to a system, method, or computer program product for providing a reallocation of resources contextual visual element and double verification requirement for resource distribution. In this way, the system identifies goals associated with a user and generated contextual visual elements associated with those goals. Based on a triggering event, the system displays the customized contextual visual element on a display of the user's device locking the functionality of the user device for a period of time the contextual visual element is displayed. Furthermore, the system may integrate and code a double verification requirement into resource distribution applications, requiring secondary authentication and additional verification for resource distribution.

18 Claims, 6 Drawing Sheets (56) References Cited

U.S. PATENT DOCUMENTS

| | | |
|---|---|---|
| 2008/0097851 A1 | 4/2008 | Bemmel et al. |
| 2008/0126145 A1 | 5/2008 | Rackley, III et al. |
| 2008/0167017 A1 | 7/2008 | Wentker et al. |
| 2008/0207234 A1 | 8/2008 | Arthur et al. |
| 2008/0208743 A1 | 8/2008 | Arthur et al. |
| 2008/0228637 A1 | 9/2008 | Scipioni et al. |
| 2008/0242274 A1 | 10/2008 | Swanburg et al. |
| 2009/0076912 A1 | 3/2009 | Rajan et al. |
| 2009/0094125 A1 | 4/2009 | Killian et al. |
| 2009/0119190 A1 | 5/2009 | Realini |
| 2009/0204916 A1 | 8/2009 | Benedek et al. |
| 2009/0271287 A1 | 10/2009 | Halpern |
| 2010/0094752 A1 | 4/2010 | Heath |
| 2010/0191602 A1 | 7/2010 | Mikkelsen et al. |
| 2010/0262449 A1 | 10/2010 | Monteforte et al. |
| 2010/0305997 A1 | 12/2010 | Ananian et al. |
| 2011/0106600 A1 | 5/2011 | Malik et al. |
| 2013/0173319 A1 | 7/2013 | Thomas et al. |
| 2014/0058912 A1 | 2/2014 | Bajaj |
| 2015/0073952 A1 | 3/2015 | Ventura et al. |
| 2015/0170130 A1 | 6/2015 | Patel et al. |
| 2016/0086152 A1 | 3/2016 | Shilkin |
| 2017/0078621 A1 | 3/2017 | Sahay et al. |
| 2017/0177135 A1 | 6/2017 | Sarin |

\* cited by examiner

REALLOCATION OF RESOURCES SYSTEM

BACKGROUND

Advancements in technology have made mobile devices with multi-faceted functionality available to large numbers of individuals. With the continued addition of new functions to these mobile devices, requirements for resource availability presentation and interface interactions is desired.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for providing a reallocation resource interface for use by a user. In this way, the invention provides visual savings tools for resource goal achievement.

In some embodiments, the invention includes a savings tool directed to presenting visual stimuli to a user to prevent impulse withdrawals when the user initiates a transaction. The invention may generate contextual visual elements associated with the user's goals, such as an educational goal, vacation goal, or resource savings goal. In this regard, the invention generates a personalized and unique interface for each user. The invention may display the visual elements for a predetermined amount of time, such as 10 seconds, to encourage the user to perform and direct funds to a savings account, or the like. The invention may also provide feedback to the user, informing the user about what goals or what type/percentage of goals would be achievable based on current savings patterns. The invention may also enable the user to communicate with other individuals with similar goals.

In some embodiments, the invention may be directed to setting up increased verification or authentication, such as a double verification, requirement to withdraw funds. For example, the user may be allowed to set up passcodes for a particular account to safeguard the account or resource specifically. As such, the invention may incorporate passcodes or virtual numbers that are attributes of the account or resource.

In some embodiments, the invention may alert the user when the user is proximate to a particular merchant establishment. The alert may comprise budget categories and associated goals/balances, allocations for products associated with the merchant and the like to enable the user to decide how much to spend and on what.

Embodiments of the invention relate to systems, methods, and computer program products for reallocation of resources, the invention comprising: determining resources available to a user including real-time resource balances, budgets, and goals for the resources; generating a contextual visual representation of a goal product or service for the resources; storing the generated contextual visual representation on a mobile device associated with a user, wherein the contextual visual representation is coded for display based on a triggering event; identifying, on the mobile device associated with the user, one or more applications associated with resources, wherein the identified one or more applications are third party applications and allow the user to transfer resources; generating a double verification requirement for the one or more applications associated with resources, wherein the double verification requirement is an authentication for transferring resources via the one or more application; inputting code associated with the double verification requirement into the one or more applications, wherein the code requires the user to verify using the double verification prior to allowing the application to transfer resources; identifying the triggering event; and presenting the generated contextual visual representation on a display associated with the mobile device via an alert based on the identification of the triggering event, wherein the generated contextual visual representation upon presentation, locks the functionality of the mobile device for a predetermined time period.

In some embodiments, generating a contextual visual representation of a goal product or service for the resources further comprises generating a customized contextual visual representation of the goal product or service in use in an environment of the user.

In some embodiments, presenting the generated contextual visual representation on a display associated with the mobile device via an alert comprises presenting a goal product or service in the environment of the user and locking the contextual visual representation on the display of the mobile device preventing functionality of the mobile device for a period up to 10 seconds.

In some embodiments, triggering event further comprises identification that the user is preparing to transact with a merchant, wherein identifying that the user is preparing to transact with the merchant comprises identifying products in an online shopping cart associated with the user. In some embodiments, the triggering event further comprises identification that the user is preparing to transact with a merchant, wherein identifying that the user is preparing to transact with the merchant is based on GPS location of the mobile device being collocated with a merchant point of sale terminal.

In some embodiments, the double verification requirement for the one or more applications associated with resources includes code embedded into the one or more applications preventing the one or more applications from functioning to transfer resources without a passcode authorization via the double verification requirement independent from a log in to the one or more applications. In some embodiments, upon receiving a successful passcode authorization the double verification requirement is lifted and the one or more application functionality is restored to transfer resources.

In some embodiments, resources comprise financial resources of the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Furthermore, as used herein the term "user device" or "mobile device" may refer to mobile phones, personal computing devices, tablet computers, wearable devices, and/or any portable electronic device capable of receiving and/or storing data therein.

An "account" is the relationship that a user has with an entity, such as a financial institution. Examples of accounts include a deposit account, such as a transactional account (e.g., a banking account), a savings account, an investment account, a money market account, a time deposit, a demand deposit, a pre-paid account, a credit account, a non-monetary user profile that includes information associated with the user, or the like. The account is associated with and/or maintained by the entity. "Resources" include accounts of the user and/or other property owned by the user. The resources may be associated with accounts or may be property that is not associated with a specific account. Examples of resources associated with accounts may be accounts that have cash or cash equivalents, or accounts that are funded with or contain property, such as safety despots box account that jewelry, a trust account that is funded with property, or the like. Examples of resources that may not be associated with accounts may be antiques in a user's home, jewelry in a user's home, or the like. "Funds" or "Available Balance" are a balance in an account that can be invested or withdrawn. For example, the funds may refer to a bank ledger balance minus the amount of any monetary checks in the process of collection. Funds may also be referred to as an available balance, a collected balance, good funds, and usable funds.

Inflows refer to funds received from or deposited into the user's resources (e.g., user's accounts, or the like), such as paychecks, 401K disbursements, pension disbursements, rental property, or the like. Outflows refer to funds outgoing from the user's resources (e.g., user's accounts, or the like) to cover liabilities, such as payments for housing (e.g., rent or mortgage), bills, health care insurance and other costs, heat, water, food, car, boat, transportation, or like, which illustrates all of the essential (e.g., necessary or semi-necessary to the user) costs that cover what the user currently uses to live. A "payment" is a monetary amount or item of monetary value transferred from one individual or entity to another individual or entity in return for receipt of good(s) and/or services.

A "transaction" refers to any communication between a user and the financial institution or other entity monitoring the user's activities. For example, a transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

A "user" may be a financial institution user (e.g., an account holder or a person who have an account (e.g., banking account, credit account, or the like)). In one aspect, a user may be any financial institution user involved in retirement planning with the financial institution or any other affiliate entities associated with the financial institution. In some embodiments, the user may be an individual who may be interested in opening an account with the financial institution. In some other embodiments, a user may be any individual who may be interested in enrolling in the retirement plan offered by the financial institution. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "user" may be used interchangeably.

Embodiments of the present invention address the above needs and/or achieve other advantages by providing apparatuses (e.g., a system, computer program product and/or other devices) and methods for a reallocation of resource system process. In this way, the invention provides additional security requirement for resource allocation and usage. The additional security requirements includes an incorporation and implementation of contextual visual element presentation and additional authentication requirements In some embodiments, the invention includes a savings tool directed to presenting visual stimuli to a user to prevent impulse withdrawals when the user initiates a transaction. The invention may generate contextual visual elements associated with the user's goals, such as an educational goal, vacation goal, or resource savings goal. In this regard, the invention generates a personalized and unique interface for each user. The invention may display the visual elements for a predetermined amount of time, such as 10 seconds, to encourage the user to perform and direct funds to a savings account, or the like. The invention may also provide feedback to the user, informing the user about what goals or what type/percentage of goals would be achievable based on current savings patterns. The invention may also enable the user to communicate with other individuals with similar goals.

In some embodiments, the invention may be directed to setting up increased verification or authentication, such as a double verification, requirement to withdraw funds. For example, the user may be allowed to set up passcodes for a particular account to safeguard the account or resource specifically. As such, the invention may incorporate passcodes or virtual numbers that are attributes of the account or resource.

In some embodiments, the invention may alert the user when the user is proximate to a particular merchant establishment. The alert may comprise budget categories and associated goals/balances, allocations for products associated with the merchant and the like to enable the user to decide how much to spend and on what.

Embodiments of the invention are directed to a system, method, or computer program product for a distributive network system with specialized data feeds associated with the distributive network and specific triggering events associated with the data feeds for coding and overlaying the security requirements. Thus, the system may communicate with, store, and execute code on a mobile device for completion of an overlay and authentication of the restrictive reallocation resource security requirements.

Figure 1:
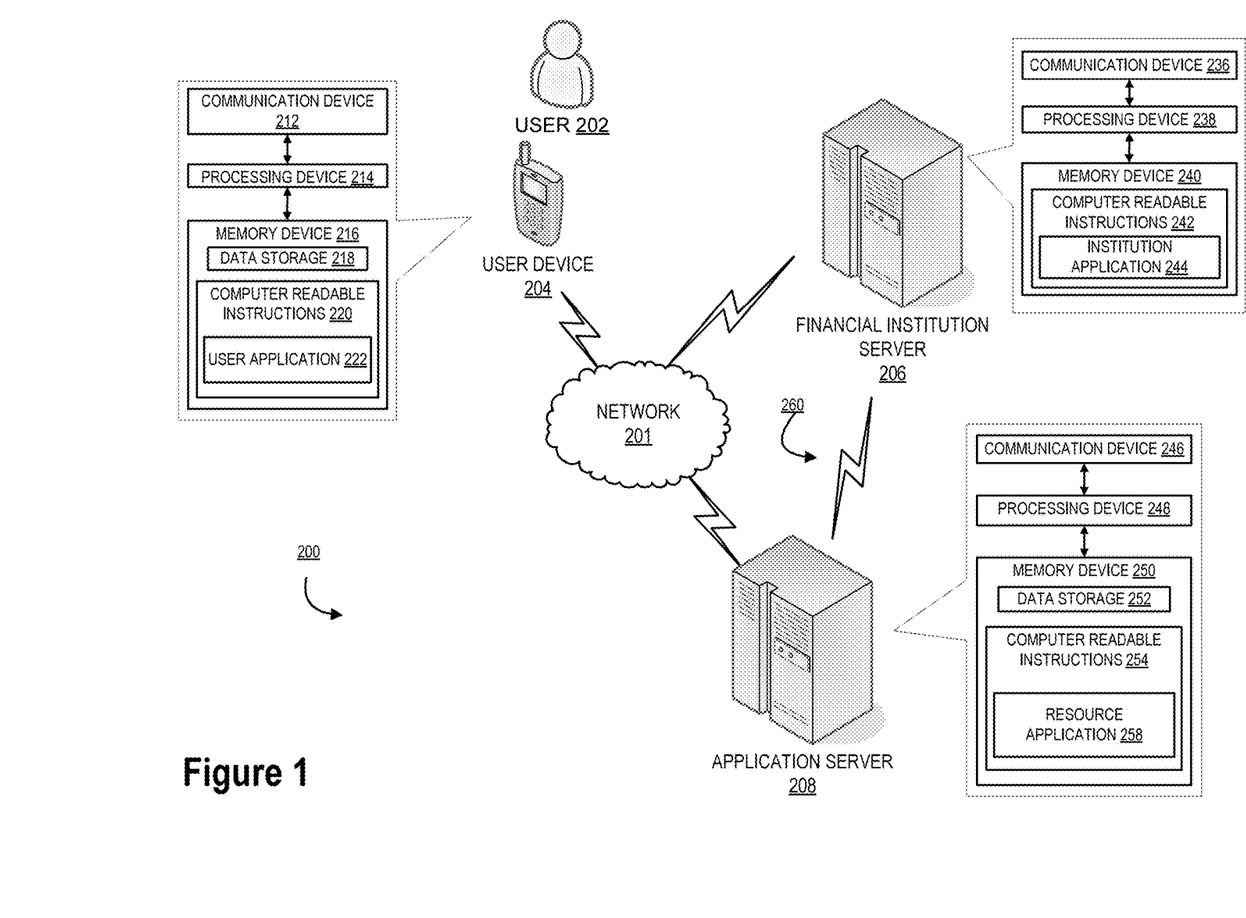
FIG. 1 provides a reallocation of resources system environment, in accordance with one embodiment of the present invention.

FIG. 1 illustrates a reallocation of resources system environment 200, in accordance with one embodiment of the present invention. FIG. 1 provides the system environment 200 for which the distributive network system with specialized data feeds associated with the restrictive reallocation of resources system for generation and production of contextual visual elements and double verification requirements for resources.

FIG. 1 provides a unique system that includes specialized servers and system communicably linked across a distributive network of nodes required to perform the functions of restrictive reallocation of resources via contextual visual elements and double verification requirements. In this way, the system may produce user specific contextual visual elements and present the elements on a display of a user device 204 and lock functionality of the user device 204 for a period of time. This contextual visual element presentation is triggered via an identification of a transaction occurring, thus the system may automatically present a custom made contextual visual element to the user via the user device 204 and completely disabling the functionality of the user device 204 for a predetermined duration of time that the element is present on the display. As such, the system may manipulate the physical functionality of the user device 204 by inhibiting functions on the device for a period of time based on a triggering.

Furthermore, the system may integrate and store within applications on the user device 204 a required double verification for access to a portion of the application. As such, the system may store code on an application associated with resource withdrawing that requires a double verification to withdraw resources. As such, upon entering the application, the user may access the applications content via username and/or password. If the user desires to withdraw resources from the application, the system is triggered and a secondary authentication is required. In this way, upon selecting to withdraw funds, the system requires a user to input another password in the form of a double verification to ensure the user's desire to withdraw funds.

As illustrated in FIG. 1, the application server 208 is operatively coupled, via a network 201 to the user system 204, and to the financial institution server 206. In this way, the application server 208 can send information to and receive information from the user device 204 and the financial institution server 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that has a user device, such as a mobile phone, tablet, or the like. FIG. 1 also illustrates a user system 204. The user device 204 may be, for example, a desktop personal computer, a mobile system, such as a cellular phone, smart phone, personal data assistant (PDA), laptop, or the like. The user device 204 generally comprises a communication device 212, a processing device 214, and a memory device 216. The user device 204 is a computing system that provide authentication for resource viewing and for interaction and manipulation of applications associated with resource management. The processing device 214 is operatively coupled to the communication device 212 and the memory device 216. The processing device 214 uses the communication device 212 to communicate with the network 201 and other devices on the network 201, such as, but not limited to the financial institution server 206 and the application server 208. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222.

In some embodiments, the user application 222 allows a user 202 to provide authentication for resource viewing via applications, receive contextual visual elements, and for providing double verification input. In some embodiments, the user application 222 allows the user to sign onto or authenticate the double verification required for application access for withdrawing or transferring of resources.

As further illustrated in FIG. 1, the application server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the financial institution server 206 and the user system 204. As such, the communication device 246 generally comprises a modem, server, or other device for communicating with other devices on the network 201.

As further illustrated in FIG. 1, the application server 208 comprises computer-readable instructions 254 stored in the memory device 250, which in one embodiment includes the computer-readable instructions 254 of a resource application 258. In some embodiments, the memory device 250 includes data storage 252 for storing data related to the system environment, but not limited to data created and/or used by the resource application 258.

In the embodiment illustrated in FIG. 1 and described throughout much of this specification, the resource application 258 may determine resource balances, receive budgets and goals, generate and implement contextual visual elements, generate and code double verification for resource applications, and present the contextual visual element and/or double verification based on triggers.

In some embodiments, the resource application 258 may determine resource balances. In this way, the resource application 258 may communicate with the financial institution server 206, the user device 204, and merchants to identify resources the user may have. Furthermore, the resource application 258 may contact merchants to identify scheduled reoccurring payments that the user may have with one or more merchants, individuals, or the like.

In some embodiments, the resource application 258 may receive budgets and goals. In some embodiments, the resource application 258 may present an interface at the user device requesting one or more budgets and/or goals for products and services of the user 202. In other embodiments, the resource application 258 may determine budgets and/or goals based on accessing one or more budgeting tools used by the user 202 via his/her user device. In this way, the resource application 258 may integrate information from the budgeting tools into the memory device 250. In other embodiments, the resource application 258 may access a financial institution server 206 and import one or more budgetary information from the financial institution for the user 202. In some embodiments, receiving budgets and/or goals from the user 202 includes receiving products and/or services that the user may wish to purchase at some future time. In some embodiments, the goal products/services may be identified based on user 202 input. As such, in some embodiments, the resource application 258 may present an interface at the user device 204 requesting one or more budgets or goal products/services of the user 202. In some embodiments, the resource application 258 may determine budget and/or goal products and/or services of the user 202 based on one or more social network posts of the user 202.

In some embodiments, the resource application 258 may generate and implement contextual visual elements. In this way, once the resource application 258 may generate the contextual visual element, which includes a picture of the goal product and/or service. In this way, the resource application 258 may generate a digital photograph of the product, a representation of the service, the product or service in use, or a reminder of the product or service. Once the contextual visual element has been generated by the resource application 258, it may be customized for the user 202 by the resource application 258 and stored on the user device 204. As such, the resource application 258 may customize the product or service illustrated in the contextual visual element. This may be a changing of the color, size, style, or the like of the product to match the user's interest and goal. In some embodiments, the contextual visual element may be customized to illustrate the use of the service or product at the user's home or in the user's environment. In this way, the goal product or service may be customized to illustrate the goal product or service in the user's environment in a style that the user desires to purchase.

In some embodiments, the resource application 258 may generate and code double verification for resource applications. As such, the resource application 258 may determine applications that include resources that may be withdrawn by the user 202. In this way, once these applications are identified, the resource application 258 may increase the requirements for withdrawing resources from the one or more accounts storing the resources. In this way, the resource application 258 may increase to a double verification requirement for resource withdraw from an account.

Once the resource application 258 has determined the accounts to increase to double verification, the resource application 258 may send a request to the user 202 to allow the user 202 to set the password or passcode for the double verification. Once the user 202 has selected his/her verification password the resource application 258 may import the double verification password into the application associated with the resource on the user device 204. In this way, the resource application 258 may integrate a compatible coded insert into the application that includes the double verification and a correct response to the double verification.

In some embodiments, the resource application 258 may present the contextual visual element and/or double verification based on triggers. As such, the resource application 258 may present the contextual visual element upon identification of a transaction. In this way, the resource application 258 may identify that a user 202 is about to make a purchase with a merchant. The transaction may not be for the product or service of the goal. In some embodiments, this identification may be made via GPS tracking of the user device 204 associated with the user 202 and identified that the user device 204 is collocated with a merchant location.

After identifying the pending transaction, the resource application 258 may present the contextual visual element on a display associated with the user device 204 prior to completion of the transaction. In this way, the contextual visual element may be, based on the identification of the pending user transaction, positioned as an overlay on top of the screen currently on the user device 204. Furthermore, the contextual visual element may be presented and locked onto the screen of the user device 204 causing blockage of access to the functionality of the user device 204 for a period of time, such as 2, 5, or 10 seconds. In this way, the contextual visual element reminds the user 202 of a goal and the impact of the purchase of the pending transaction on the user's goals. As such, the resource application 258 may present the contextual visual element as a lock to all device functionality on the user's device. The lock may also include an alert sound or vibration triggered and activated by the contextual visual element to alert the user 202 of the contextual visual element and ensures the user 202 views the contextual visual element prior to completing the purchase. Thus, giving the user 202 a chance to perform certain actions such as changing his/her mind about the pending transactions.

The resource application 258 may also require a double verification for any resource withdraw being made. Since the resource application 258 has integrated the double verification into the applications associated with resource withdraw, upon opening of the application, the code is triggered to require the application to introduce the double verification and not open or activate until a correct response to the double verification is provided. In some embodiments, the coded verification is only triggered to present to the user 202 when the application is asked to withdraw or transfer resources from the account associated with the application.

As illustrated in FIG. 1, the financial institution server 206 is connected to the application server 208 and is associated with a financial institution network. In this way, while only one financial institution server 206 is illustrated in FIG. 1, it is understood that multiple network systems may make up the system environment 200. The financial institution server 206 generally comprises a communication device 236, a processing device 238, and a memory device 240. The financial institution server 206 comprises computer-readable instructions 242 stored in the memory device 240, which in one embodiment includes the computer-readable instructions 242 of an institution application 244. The financial institution server 206 may communicate with the application server 208 to provide authentication credentials for resources and provide resource status information. While the application server 208 may communicate with the financial institution server 206 via a secure connection 260 generated for secure encrypted communications between the two systems for manipulating and transferring funds to one or more different resources.

It is understood that the servers, systems, and devices described herein illustrate one embodiment of the invention. It is further understood that one or more of the servers, systems, and devices can be combined in other embodiments and still function in the same or similar way as the embodiments described herein.

Figure 2:
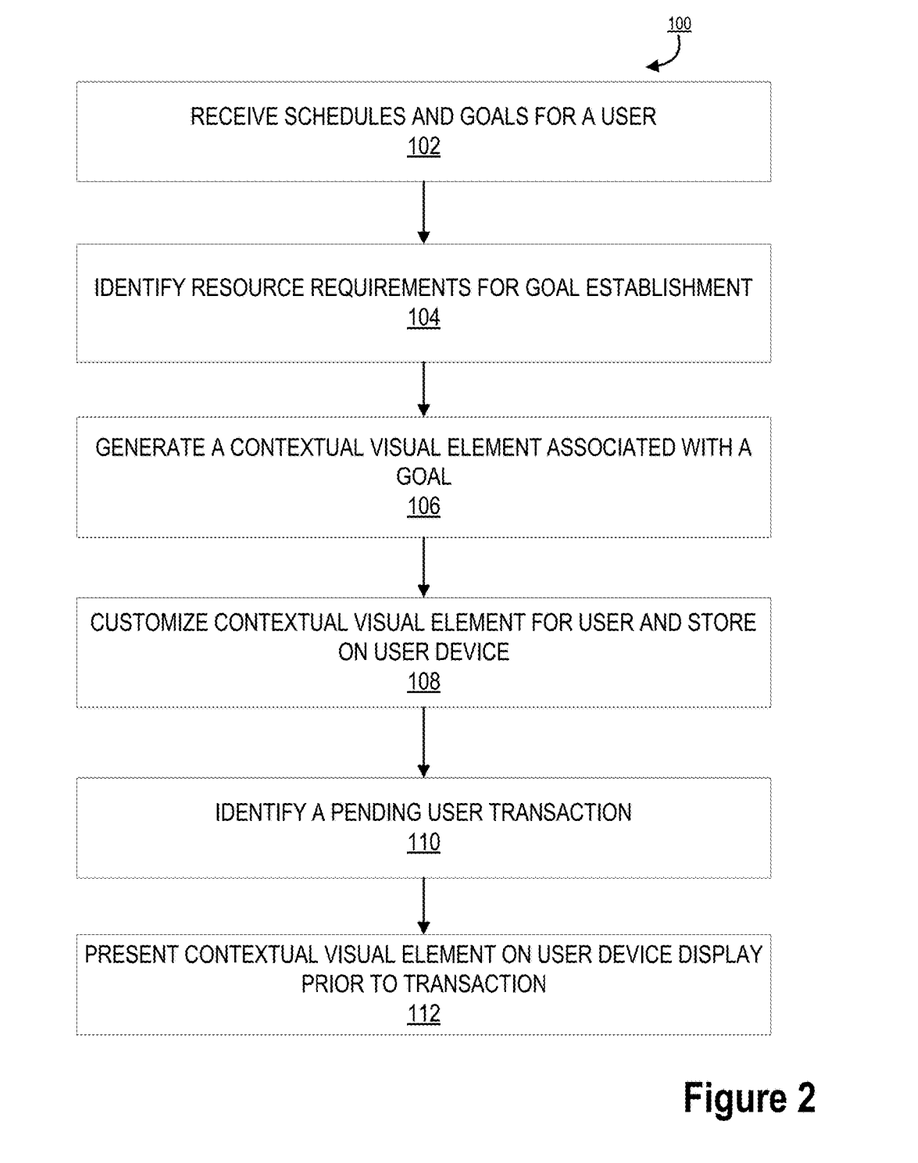
FIG. 2 provides a high level process flow illustrating the reallocation of resource system process, in accordance with one embodiment of the present invention.

FIG. 2 provides a high level process flow illustrating the reallocation of resource system process 100, in accordance with one embodiment of the present invention. As illustrated in block 102, the process 100 is initiated by receiving schedules and goals for a user. In some embodiments, the schedules include user budgets. The user budgets may be an amount of resources the user wishes to spend on items or categories of items within a time period. Furthermore the budget may include one or more items that the user desires to save resources for purchasing. In some embodiments, the goals include products and/or services the user may be saving resources for purchasing. The goals may be products, services, or the like.

Next, as illustrated in block 104, the process 100 continues by identifying the resource requirements for meeting the goals of the user. As such, the system receives the goals of the user and subsequently performs a search of merchants or vendors to determine a cost associated with the purchase of the product or service of the goal. In some embodiments, the cost may be a down payment or deposit towards a goal product, such as a house or vehicle. In other embodiments, the cost may include the total purchase price for the product or service associated with the goal. The goals may require resources, such as monetary funds, to acquire the item.

As illustrated in block 106, the process 100 continues by generating a contextual visual element associated with the received goal. The contextual visual element includes a picture of the goal product and/or service. In this way, the system may generate a digital photograph of the product, a representation of the service, the product or service in use, or a reminder of the product or service.

Once the contextual visual element has been generated, it may be customized for the user and stored on a mobile device associated with the user, as illustrated in block 108. As such, the system may customize the product or service illustrated in the contextual visual element. This may be a changing of the color, size, style, or the like of the product to match the user's interest and goal. In some embodiments, the contextual visual element may be customized to illustrate the use of the service or product at the user's home or in the user's environment. In this way, the goal product or service may be customized to illustrate the goal product or service in the user's environment in a style that the user desires to purchase.

Next, as illustrated in block 110, the system may identify a pending user transaction. In this way, the system may identify that a user is about to make a purchase with a merchant. The transaction may not be for the product or service of the goal. In some embodiments, this identification may be made via GPS tracking of a mobile device associated with the user and identified that the mobile device is collocated with a merchant location. In some embodiments, the system may identify that the user added products to the user's cart via an online shopping website. In yet other embodiments, the system may receive an identification from a merchant or a user that a transaction is pending between the merchant and the user.

Finally, as illustrated in block 112, the process 100 is completed by presenting a contextual visual element on a user display prior to the transaction. In this way, the contextual visual element may be, based on the identification of the pending user transaction, positioned as an overlay on top of the screen currently on the user device. The overlay may cover at least a portion of the screen associated with the user device. Furthermore, the overlay may be presented and lock access to the functionality of the user device for a period of time, such as 2, 5, or 10 seconds. In this way, the contextual visual element reminds the user of a goal and the impact of the purchase of the pending transaction on the user's goals. As such, the system may present the contextual visual element as a lock to all device functionality on the user's device. The lock may also include an alert sound or vibration triggered and activated by the contextual visual element to alert the user of the contextual visual element and ensure the user views the contextual visual element prior to completing the purchase. Thus, giving the user a chance to perform certain actions such as changing his/her mind about the pending transactions.

Furthermore, the system may link other individuals with similar product or service goals to the user, such that the individuals may communicate with each other. In some embodiments, the system may also provide for feedback to the user about the goal progress. In some embodiments, the system may also provide information to the user about what goals or types of goals that would be achieved based on current savings. These additional features may also be presented to the user via the contextual visual element. As such, upon expiration of the locked period, the contextual visual element may allow a user to select the options or return to the user device main screen.

Figure 3:
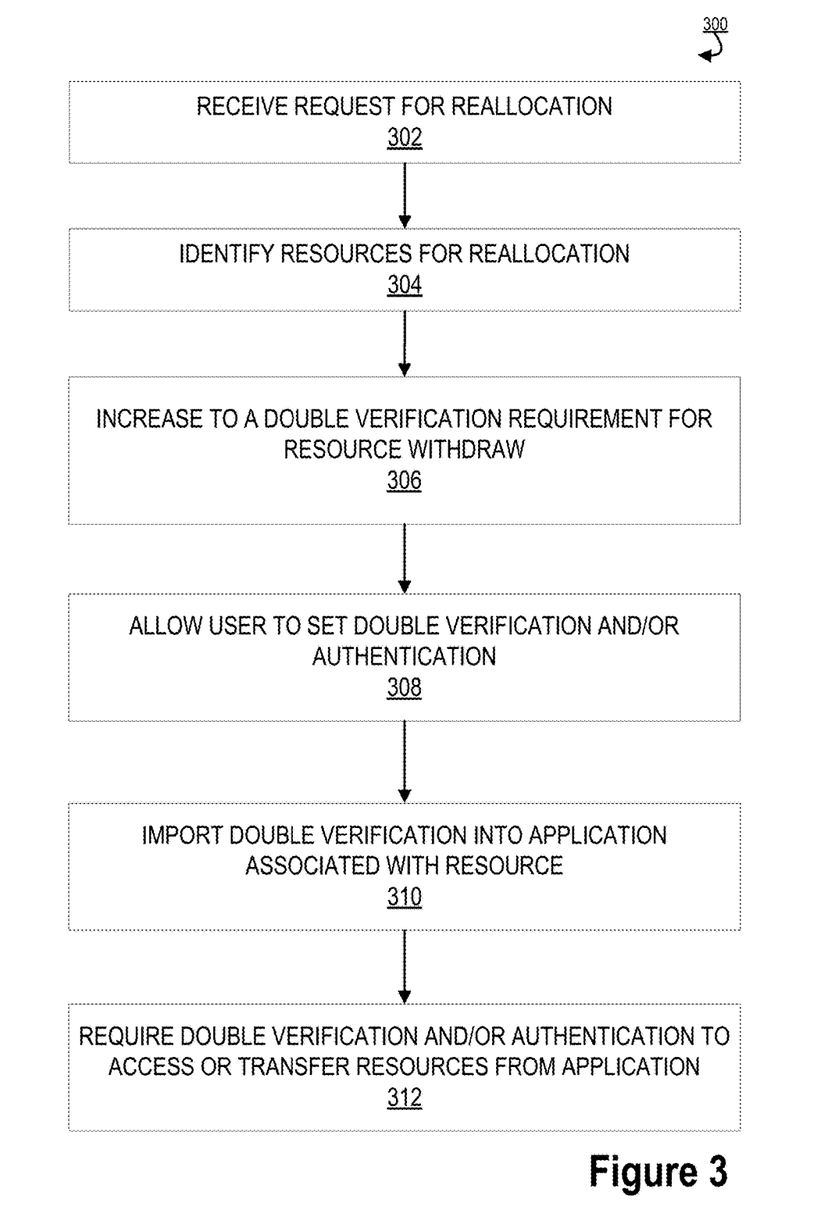
FIG. 3 provides a high level process flow illustrating the reallocation of resource system process, in accordance with one embodiment of the present invention.

FIG. 3 illustrates a high level process flow illustrating the reallocation of resource system process 300, in accordance with one embodiment of the present invention. As illustrated in block 302, the process 300 is initiated by receiving a request from a user for restrictive reallocation. Restrictive reallocation forms a part of the restrictive reallocation resources system by integrating a tool directed to setting up increased verification and/or authentication requirements to assess and withdraw resources.

As such, upon receiving the request for the restrictive reallocation tool, the system may next, as illustrated in block 304, identify the resources available to the user for restrictive reallocation implementation. These resources may be identified based on communication with one or more financial institutions or the like responsible for maintaining the resources associated with the user. Once these resources are identified, the system may extract information about each resource. This information may include the entity maintaining the resource, an amount of funds, an account number, access information, and the like associated with the resources.

Next, as illustrated in block 306, the process 300 continues by increasing the requirements for withdrawing resources from the one or more accounts storing the resources. In this way, the system may increase to a double verification requirement for resource withdraw from an account.

Once the system has determined the accounts to increase to double verification, the system may send a request to the user to allow the user to set the double verification, as illustrated in block 308. The user may input the verification, the verification may be a password, passcode, PIN, response to security question, or any other user selected identifier. In some embodiments, the user may input a username and a password. In other embodiments, the user may enter a PIN number or alpha numeric code. In yet other embodiments, the user may allow the system to generate a series of authentication questions for a user to answer one or more of for verification. As such, the user may select the level of authentication needed for the double verification requirement.

Next, as illustrated in block 310, once the user has selected his/her verification password the system may import the double verification password into the application associated with the resource. In this way, the system may integrate into the application associated with the resource on the user device. These applications may include applications such as a financial institution application, credit card application, or the like. In this way, the system may integrate a compatible coded insert into the application that includes the double verification and a correct response to the double verification. As such, upon opening of the application, the code is triggered to require the application to introduce the double verification and not open or activate until a correct response to the double verification is provided. In some embodiments, the coded verification is only triggered to present to the user when the application is asked to withdraw or transfer resources from the account associated with the application. For example, if the user has an account with Bank 1 and desires to transfer resources from that account, the user may open the application associated with Bank 1 and proceed to the withdraw or transfer section of the application. Upon selection of the transfer tab in the Bank 1 application, the code from the system is triggered and locks access to the transfer functionality of the Bank 1 application. Upon receiving a correct double verification response from the user, the system allows the application to continue to the transfer landing page for the completion of transferring of resources. In this way, as illustrated in block 312, the process 300 is completed upon requiring the double verification to access and/or transfer resources from the application.

Figure 4:
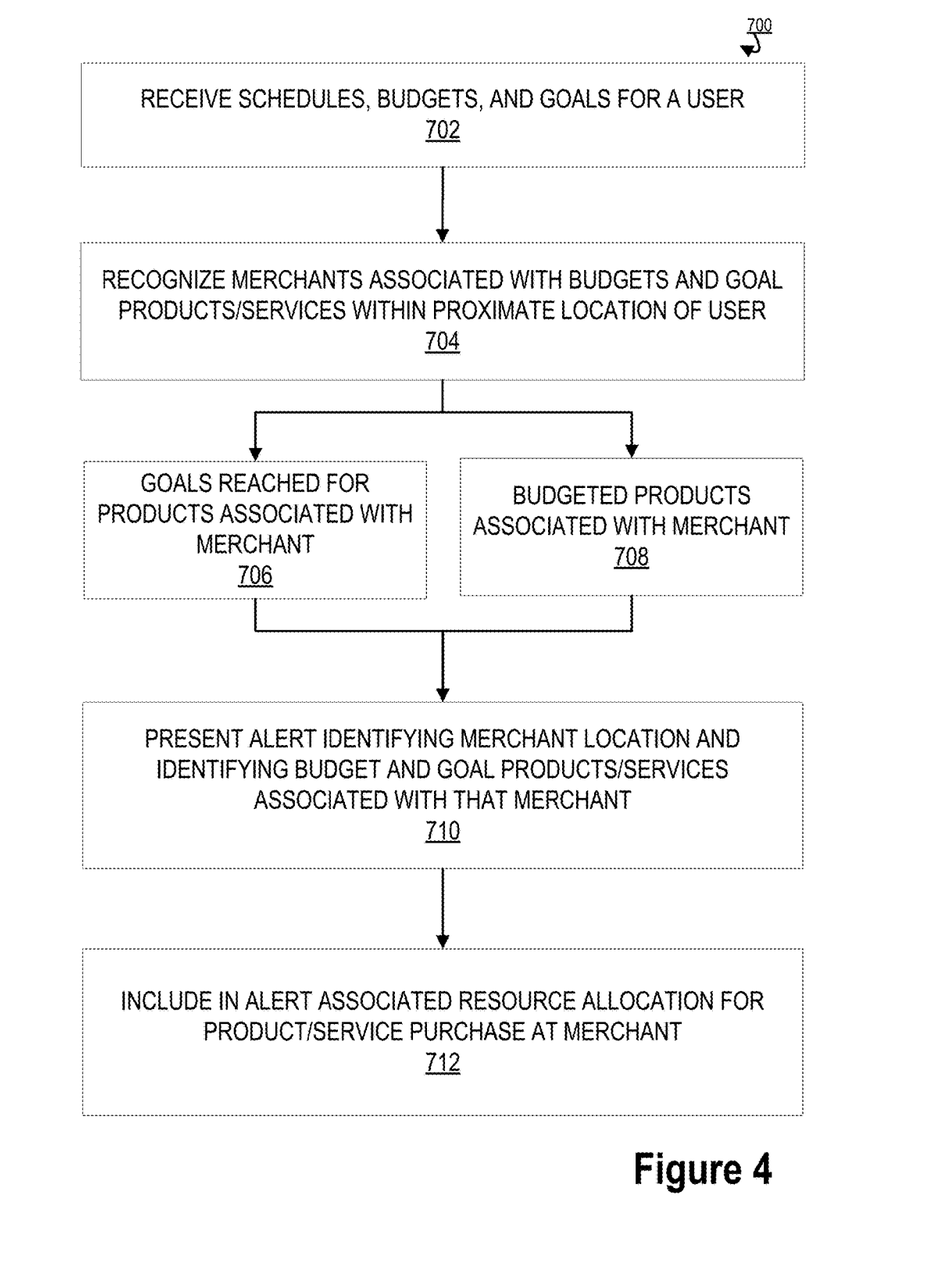
FIG. 4 provides a process map illustrating confirmation of reaching reallocation goals, in accordance with one embodiment of the present invention.

FIG. 4 illustrates a process map for confirmation of reaching reallocation goals 700, in accordance with one embodiment of the present invention. As illustrated in block 702, the process 700 initiated by receiving schedules, budgets, and goals for a user. In some embodiments, the system may present an interface at the user device requesting one or more schedules, budgets, and/or goals for products and services of the user. In other embodiments, the system may determine budgets based on accessing one or more budgeting tools used by the user via his/her user device. In this way, the system may integrate information from the budgeting tools into the restrictive reallocation of resources system. In other embodiments, the system may access a financial institution server and import one or more budgetary information from the financial institution for the user.

In some embodiments, receiving goals from the user includes receiving products and/or services that the user may wish to purchase at some future time. In some embodiments, the goal products/services may be identified based on user input. As such, in some embodiments, the system may present an interface at the user device requesting one or more goal products/services of the user. In some embodiments, the system may identify goal products based on budgetary software or interaction with a financial institution associated with the user to identify potential products and/or services the user may wish to purchase. In some embodiments, the system may determine the goal products/services of the user based on one or more social network posts of the user.

In some embodiments, the schedules include one or more payment schedules the user may have with one or more entities. These may be scheduled future payments to the entity. The system may identify the schedules from one or more entities, the user, or the like.

As illustrated in block 704, the process 700 continues by recognizing merchants associated with budgeted and goaled products and/or services within proximate location of the user. In this way, the system may use the GPS associated with the user device to identify the user's location relative to the merchants. The system may identify a proximate location as being within walking distance, such as 5 miles or less. Furthermore, the system may identify the products and services provided by merchants in the proximity to the user. In some embodiments, the system may do so by retrieving product information for each merchant from the merchant website, advertisements, social networking data, crowd sourcing, or the like.

As illustrated in block 706, the system may identify if any products or services associated with reached goals are available from the merchant within proximate location. As such, the system may identity all merchants that may sell the products or services that the user may have a goal to purchase. Once the products of the goals of a user are identified, the system may identify if there are any goals reached by the user. If a goal is reached, the system may flag that goal, the product/service of that goal, and the merchant associated with the product/merchant.

As illustrated in block 708, the system may identify any budgeted products associated with the proximate merchant. In this way, the system may identify one or more products or services the user includes in his/her budget at the merchant proximate to the user location.

Once products and services are identified associated with goals and/or budgets, the system may, as illustrated in block 710 present an alert identifying merchant locations and identifying the budget or goal products/services associated with that merchant that have been identified as a reached goal in block 706 and/or a budgeted product in block 708. The alert may be presented to the user as a visual element on the user's mobile device. Similar to the contextual visual element, this visual element may be presented on the user's mobile device and lock all other applications on the mobile device for a predetermined time frame. Along with the presented budged and successful goal meeting products/services the system may present associated resource allocations for the product/service purchase at the proximate merchant, as illustrated in block 712.

Figure 5:
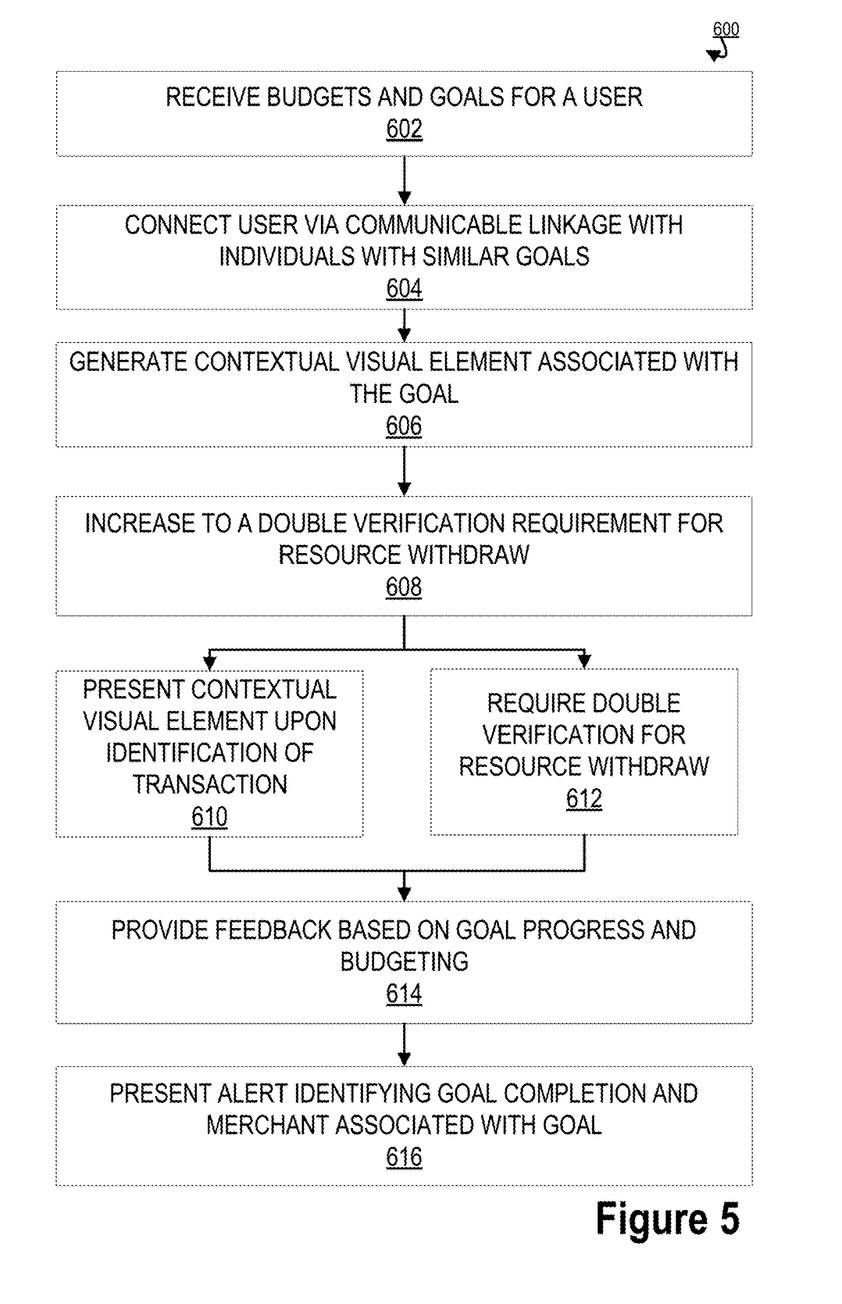
FIG. 5 provides a process map illustrating contextual visual element and double verification implementation in a restrictive reallocation process, in accordance with one embodiment of the present invention.

FIG. 5 illustrates a process map of contextual visual element and double verification implementation in a restrictive reallocation process 600, in accordance with one embodiment of the present invention. As illustrated in block 602, the process 600 is initiated by receiving budgets and goals for a user.

In some embodiments, the system may present an interface at the user device requesting one or more budgets and/or goals for products and services of the user. In other embodiments, the system may determine budgets and/or goals based on accessing one or more budgeting tools used by the user via his/her user device. In this way, the system may integrate information from the budgeting tools into the restrictive reallocation of resources system. In other embodiments, the system may access a financial institution server and import one or more budgetary information from the financial institution for the user. In some embodiments, receiving budgets and/or goals from the user includes receiving products and/or services that the user may wish to purchase at some future time. In some embodiments, the goal products/services may be identified based on user input. As such, in some embodiments, the system may present an interface at the user device requesting one or more budgets or goal products/services of the user. In some embodiments, the system may determine budget and/or goal products/services of the user based on one or more social network posts of the user.

Next, as illustrated in block 604, the process 600 continues by connecting users via a communicable linkage through the restrictive reallocation system with other individuals with similar goal products/services. In this way, the users may have a direct secure connection between users to discuss the goal products/services, merchants providing the goal products/services, and/or deals associated with the products/services.

Next, as illustrated in block 606, the system may generate a contextual visual element associated with the goal product/service. The contextual visual element includes a picture of the goal product and/or service. In this way, the system may generate a digital photograph of the product, a representation of the service, the product or service in use, or a reminder of the product or service. Once the contextual visual element has been generated, it may be customized for the user and stored on a mobile device associated with the user. As such, the system may customize the product or service illustrated in the contextual visual element. This may be a changing of the color, size, style, or the like of the product to match the user's interest and goal. In some embodiments, the contextual visual element may be customized to illustrate the use of the service or product at the user's home or in the user's environment. In this way, the goal product or service may be customized to illustrate the goal product or service in the user's environment in a style that the user desires to purchase.

As illustrated in block 608, the process 600 continues by increasing to a double verification requirement for resource withdraw. As such, the system increases the requirements for withdrawing resources from the one or more accounts storing the resources. In this way, the system may increase to a double verification requirement for resource withdraw from an account.

Once the system has determined the accounts to increase to double verification, the system may send a request to the user to allow the user to set the double verification. The user may input the verification, the verification may be a password, passcode, PIN, response to security question, or any other user selected identifier. In some embodiments, the user may input a username and a password. In other embodiments, the user may enter a PIN number or alpha numeric code. In yet other embodiments, the user may allow the system to generate a series of authentication questions for a user to answer one or more of for verification. As such, the user may select the level of authentication needed for the double verification requirement. In some embodiments, once the user has selected his/her verification password the system may import the double verification password into the application associated with the resource. In this way, the system may integrate into the application associated with the resource on the user device. These applications may include applications such as a financial institution application, credit card application, or the like. In this way, the system may integrate a compatible coded insert into the application that includes the double verification and a correct response to the double verification.

As illustrated in block 610, the system may present the contextual visual element upon identification of a transaction. In this way, the system may identify that a user is about to make a purchase with a merchant. The transaction may not be for the product or service of the goal. In some embodiments, this identification may be made via GPS tracking of a mobile device associated with the user and identified that the mobile device is collocated with a merchant location. In some embodiments, the system may identify that the user added products to the user's cart via an online shopping website. In yet other embodiments, the system may receive an identification from a merchant or a user that a transaction is pending between the merchant and the user.

After identifying the pending transaction, the system may present the contextual visual element on a user display prior to completion of the transaction. In this way, the contextual visual element may be, based on the identification of the pending user transaction, positioned as an overlay on top of the screen currently on the user device. The overlay may cover at least a portion of the screen associated with the user device. Furthermore, the overlay may be presented and lock access to the functionality of the user device for a period of time, such as 2, 5, or 10 seconds. In this way, the contextual visual element reminds the user of a goal and the impact of the purchase of the pending transaction on the user's goals. As such, the system may present the contextual visual element as a lock to all device functionality on the user's device. The lock may also include an alert sound or vibration triggered and activated by the contextual visual element to alert the user of the contextual visual element and ensure the user views the contextual visual element prior to completing the purchase. Thus, giving the user a chance to perform certain actions such as changing his/her mind about the pending transactions.

As illustrated in block 612, the system may also require a double verification for any resource withdraw being made.

Since the system has integrated the double verification into the applications associated with resource withdraw, upon opening of the application, the code is triggered to require the application to introduce the double verification and not open or activate until a correct response to the double verification is provided. In some embodiments, the coded verification is only triggered to present to the user when the application is asked to withdraw or transfer resources from the account associated with the application.

Next, as illustrated in block 614, the system may also provide for feedback to the user about goal and budgeting progress. In some embodiments, the system may also provide information to the user about what goals or types of goals that would be achieved based on current savings. These additional features may also be presented to the user via the contextual visual element. As such, upon expiration of the locked period, the contextual visual element may allow a user to select the options or return to the user device main screen.

Finally, as illustrated in block 616, the process 600 is completed by presenting alerts identifying goal completion and budget completion and the merchants associated with the goal or budgeted product/service. The alert may be presented to the user as a visual element on the user's mobile device. The visual element may be presented on the user's mobile device and lock all other applications on the mobile device for a predetermined time frame. Along with the presented budged and successful goal meeting products/services the system may present associated resource allocations for the product/service purchase at the proximate merchant.

Figure 6:
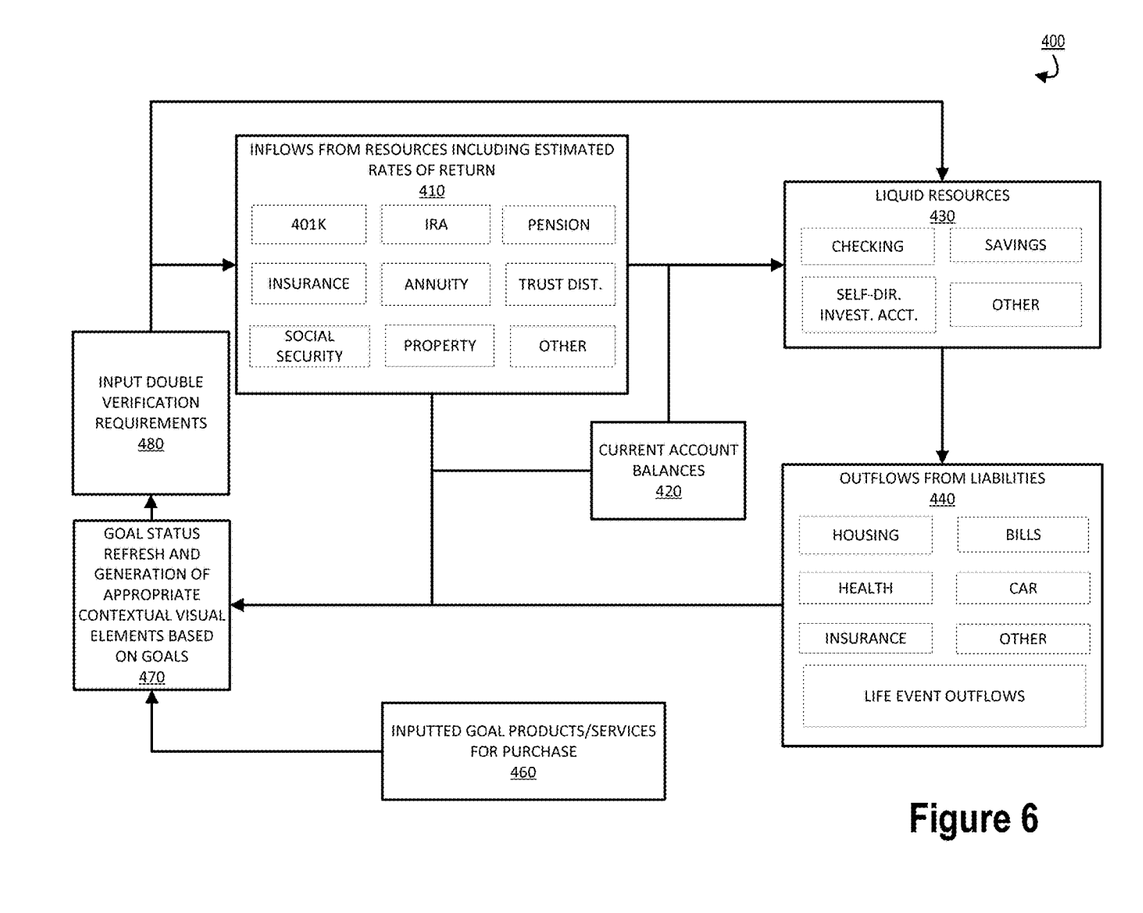
FIG. 6 provides a process map illustrating identifying and monitoring resources for restrictive reallocation, in accordance with one embodiment of the present invention.

FIG. 6 provides a process map illustrating identifying and monitoring resources for restrictive reallocation 400, in accordance with one embodiment of the present invention. Block 410 illustrates a number of resources, such as types of accounts, investments, annuities, property, or the like that may provide a stream of income (or negative steam of income) or payments over a period of time, but which may also be illiquid or otherwise difficult to convert into cash. For example, types of resources that provide disbursements may be a 401K that requires minimum disbursements to the user over a period of time at a specific age; an IRA that requires minimum disbursements to the user over a period of time at a specific age; a pension account that may provide disbursements until the user passes away; insurance benefits that may be distributed as an annuity for a period of time or as a lump sum; a trust account from which disbursement are made, property that provides rental income to the user, social security income or death benefits that pays disbursements for a period of time (e.g., a specific amount of time or for the life of a beneficiary), or other like annuity. In some embodiments of the invention the resources may include estimated rates of returns such that not only are the disbursements used in determining the available fund amount and/or age parameter, but the principal and growth of the principal over time may be used in determining the available fund amount and/or age parameter.

Block 430 illustrates liquid (e.g., liquid or semi-liquid) resources, such as accounts that may be equivalent to cash or resources that can be converted quickly into cash. For example, the liquid accounts may be checking accounts, savings accounts, self-directed investment accounts, money market accounts, or the like. These liquid accounts may be utilized to pay for the outflows directly. In some embodiments these types of accounts may be one of the last accounts that may be utilized to pay for outflows after the inflows from block 410 are exhausted (e.g., with the exception of lifetime annuity accounts). Some of these accounts may also have rates of return (e.g., savings accounts, self-directed investment accounts, or the like) which may be factored in when calculating the available fund amount and/or the age parameter.

As illustrated in block 440 the outflows of the users may include the payments that the user makes in order to live (e.g., necessary or semi-necessary to the user for the living expenses and other liabilities of the user). For example, in some embodiments the outflows may include housing outflows, which may cover the expenses of the user for house payments, taxes, insurance, or the like that the user has to pay in order to maintain a residence. In other examples, the outflows may be related to bills, such as electric, gas, water, or the like. The user's health care cost, such as user's health care premiums and yearly estimated cost may be included. The user may have car payments that are due on a monthly (or other time period) basis. The user may also have insurance payments for the user's car, life, or the like. In addition, there may be other outflows, such as but not limited to child care payments, cell phone payments, internet, and/or other entertainment expenses that may or may not be included in the outflow calculations (e.g., may or not be considered essentials or semi-essentials). The outflows may also include some life event outflows that may be easily predictable, non-repeating outflows, and/or only periodic outflows (e.g., occurs more than the time period for which the outflows are calculated), such as but not limited to paying for a child's college, paying for a wedding, or other like life events that affect the user's outflows. As illustrated by block 410 and 430 some of these outflows may be paid by one or more of the inflows, the supplemental employment income inflow, and/or the liquid resources either directly or indirectly. As such, one or more of the user's resources may have a balance that is depleted over time as the outflows are paid.

Block 420 illustrates a real-time current account balance for all resources available to the user based on the resources identified in block 410 and 430 and subtracted the up to the minute outflows from block 440.

It should be understood that the determination of the available fund amounts over the time period may change in real-time or near real-time as the rate of return on the resources change (e.g., stock values change, rental income changes or goes away, resources are depleted, big purchases are made or sold, or the like), and costs of the liabilities change (e.g., damage to property than needs repair, variable interest rate changes, life events occur that deplete resources, loans are taken out or paid off, or the like). As such, the present invention may be constantly in real-time or near real time, or over various intervals, recalculated in order to provide a more accurate available fund amount and/or age parameter to the user, such that the user is better able to plan for retirement. Moreover, as illustrated in further detail later the user may be able to adjust the available fund amount and/or the age parameter in order to determine how changes in spending habits affect the age at which the user's resources are depleted, or vice versa.

The process 400 continues by compiling the inflows 410, liquid resources 430, outflows 440, and current balances 420 to determine an overall resource availability in real-time for the user. The system may determine and subsequently display the resources and determined balances, payment schedules such as outflows, and goals via a display. The display is presented, in some embodiments, as an overlay over an already displaying mobile device display, such as via a contextual visual element.

As illustrated in block 460, the process 400 continues by receiving inputted goal products and/or services that a user desires to purchase. As discussed in further detail above, the system may receive the goal products and/or services via user input, from external software programs, and/or communication with financial institutions.

The inputted goals from block 460, as well as the inflows, outflows, and liquid resources, may all be incorporated into refreshing a goal status of a user and generating an appropriate contextual visual element based on the goals, as illustrated in block 470. In this way, the system may generate a contextual visual element associated with the goal product/service. The contextual visual element includes a picture of the goal product and/or service. Once the contextual visual element has been generated, it may be customized for the user and stored on a mobile device associated with the user.

Finally, as illustrated in block 480, the process 400 continues by inputting the double verification requirements for resource withdraw. As such, the system increases the requirements for withdrawing resources from the one or more accounts storing the resources. In this way, the system may increase to a double verification requirement for resource withdraw from an account. In some embodiments, once the user has selected his/her verification password the system may import the double verification password into the application associated with the resource. In this way, the system may integrate into the application associated with the resource on the user device. These applications may include applications such as a financial institution application, credit card application, or the like. In this way, the system may integrate a compatible coded insert into the application that includes the double verification and a correct response to the double verification.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. Patent Application Ser. No. | Title | Filed On |
| --- | --- | --- | --- |
| 6961US1.014033.2579 | 14/987,721 | RESOURCE OPTIMIZATION ALLOCATION SYSTEM | Concurrently herewith |
| 6960US1.014033.2580 | 14/987,722 | RESOURCE ALLOCATION BASED ON AVAILABLE RESOURCES VIA INTERACTIVE INTERFACE | Concurrently herewith |
| 6962US1.014033.2581 | 14/986,996 | PREDICTIVE UTILIZATION OF RESOURCES AND ALARM SYSTEM | Concurrently herewith |
| 6907US1.014033.2582 | 14/987,725 | REAL TIME RESOURCE TRACKING AND ALLOCATION SYSTEM | Concurrently herewith |
| 6906US1.014033.2583 | 14/987,003 | REAL TIME DETERMINATION OF RESOURCE AVAILABILITY FOR USAGE | Concurrently herewith |

What is claimed is:

1. A system for reallocation of resources, the system comprising:
    a memory device with computer-readable program code stored thereon;
    a communication device;
    a processing device operatively coupled to the memory device and the communication device, wherein the processing device is configured to execute the computer-readable program code to:
        determine resources available to a user including real-time resource balances, budgets, and goals for the resources;
        generate a contextual visual representation of a goal product or service for the resources;
        store the generated contextual visual representation on a mobile device associated with a user, wherein the contextual visual representation is coded for display based on a triggering event;
        identify, on the mobile device associated with the user, one or more applications associated with resources, wherein the identified one or more applications are third party applications and allow the user to transfer resources;
        generate a double verification requirement, wherein the double verification requirement is an authentication for transferring resources via the one or more application;
        apply the double verification requirement within the one or more applications by inputting code that requires the user to verify using the double verification prior to allowing the application to transfer resources, wherein the double verification requirement is independent of any log in requirements of the one or more applications;
        identify the triggering event; and
        present the generated contextual visual representation on a display associated with the mobile device via an alert based on the identification of the triggering event and locking the functionality of the mobile device for a predetermined time period with the generated contextual visual representation on the display associated with the mobile device.

2. The system of claim 1, wherein generating the contextual visual representation of a goal product or service for the resources further comprises generating a customized contextual visual representation of the goal product or service in use in an environment of the user.

3. The system of claim 1, wherein presenting the generated contextual visual representation on a display associated with the mobile device via an alert comprises presenting a goal product or service in the environment of the user and locking the contextual visual representation on the display of the mobile device preventing functionality of the mobile device for a period up to 10 seconds.

4. The system of claim 1, wherein the triggering event further comprises identification that the user is preparing to transact with a merchant, wherein identifying that the user is preparing to transact with the merchant comprises identifying products in an online shopping cart associated with the user.

5. The system of claim 1, wherein the triggering event further comprises identification that the user is preparing to transact with a merchant, wherein identifying that the user is preparing to transact with the merchant is based on GPS location of the mobile device being collocated with a merchant point of sale terminal.

6. The system of claim 1, wherein upon receiving a successful passcode authorization the double verification requirement is lifted and the one or more application functionality is restored to transfer resources.

7. The system of claim 1, wherein resources comprise financial resources of the user.

8. A computer program product for reallocation of resources, the computer program product comprising at least one non-transitory computer-readable medium having computer-readable program code portions embodied therein, the computer-readable program code portions comprising:
an executable portion configured for determining resources available to a user including real-time resource balances, budgets, and goals for the resources;
an executable portion configured for generating a contextual visual representation of a goal product or service for the resources;
an executable portion configured for storing the generated contextual visual representation on a mobile device associated with a user, wherein the contextual visual representation is coded for display based on a triggering event;
an executable portion configured for identifying, on the mobile device associated with the user, one or more applications associated with resources, wherein the identified one or more applications are third party applications and allow the user to transfer resources;
an executable portion configured for generating a double verification requirement, wherein the double verification requirement is an authentication for transferring resources via the one or more application;
an executable portion configured for applying the double verification requirement within the one or more applications by inputting code that requires the user to verify using the double verification prior to allowing the application to transfer resources, wherein the double verification requirement is independent of any log in requirements of the one or more applications;
an executable portion configured for identifying the triggering event; and
an executable portion configured for presenting the generated contextual visual representation on a display associated with the mobile device via an alert based on the identification of the triggering event and locking the functionality of the mobile device for a predetermined time period with the generated contextual visual representation on the display associated with the mobile device.

9. The computer program product of claim 8, wherein generating the contextual visual representation of a goal product or service for the resources further comprises generating a customized contextual visual representation of the goal product or service in use in an environment of the user.

10. The computer program product of claim 8, wherein presenting the generated contextual visual representation on a display associated with the mobile device via an alert comprises presenting a goal product or service in the environment of the user and locking the contextual visual representation on the display of the mobile device preventing functionality of the mobile device for a period up to 10 seconds.

11. The computer program product of claim 8, wherein the triggering event further comprises identification that the user is preparing to transact with a merchant, wherein identifying that the user is preparing to transact with the merchant comprises identifying products in an online shopping cart associated with the user.

12. The computer program product of claim 8, wherein the triggering event further comprises identification that the user is preparing to transact with a merchant, wherein identifying that the user is preparing to transact with the merchant is based on GPS location of the mobile device being collocated with a merchant point of sale terminal.

13. The computer program product of claim 8, wherein upon receiving a successful passcode authorization the double verification requirement is lifted and the one or more application functionality is restored to transfer resources.

14. A computer-implemented method for reallocation of resources, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:
determining resources available to a user including real-time resource balances, budgets, and goals for the resources;
generating a contextual visual representation of a goal product or service for the resources;
storing the generated contextual visual representation on a mobile device associated with a user, wherein the contextual visual representation is coded for display based on a triggering event;
identifying, on the mobile device associated with the user, one or more applications associated with resources, wherein the identified one or more applications are third party applications and allow the user to transfer resources;
generating a double verification requirement, wherein the double verification requirement is an authentication for transferring resources via the one or more application;
applying the double verification requirement within the one or more applications by inputting code that requires the user to verify using the double verification prior to allowing the application to transfer resources, wherein the double verification requirement is independent of any log in requirements of the one or more applications;
identifying the triggering event; and
presenting the generated contextual visual representation on a display associated with the mobile device via an alert based on the identification of the triggering event and locking the functionality of the mobile device for a predetermined time period with the generated contextual visual representation on the display associated with the mobile device.

15. The computer-implemented method of claim 14, wherein generating the contextual visual representation of a goal product or service for the resources further comprises generating a customized contextual visual representation of the goal product or service in use in an environment of the user.

16. The computer-implemented method of claim 14, wherein presenting the generated contextual visual representation on a display associated with the mobile device via an alert comprises presenting a goal product or service in the environment of the user and locking the contextual visual representation on the display of the mobile device preventing functionality of the mobile device for a period up to 10 seconds.

17. The computer-implemented method of claim 14, wherein the triggering event further comprises identification that the user is preparing to transact with a merchant, wherein identifying that the user is preparing to transact with the merchant comprises identifying products in an online shopping cart associated with the user.

18. The computer-implemented method of claim 14, wherein the triggering event further comprises identification that the user is preparing to transact with a merchant, wherein identifying that the user is preparing to transact with the merchant is based on GPS location of the mobile device being collocated with a merchant point of sale terminal.

\* \* \* \* \*